United States Patent
Ikeda et al.

(10) Patent No.: US 6,909,207 B2
(45) Date of Patent: Jun. 21, 2005

(54) ELECTRIC TOOL AND ITS INSULATING METHOD

(75) Inventors: Tomoya Ikeda, Ibaraki (JP); Nobuhito Hosokawa, Ibaraki (JP); Yoshikazu Yokoyama, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 47 days.

(21) Appl. No.: 10/133,341

(22) Filed: Apr. 29, 2002

(65) Prior Publication Data

US 2003/0107273 A1 Jun. 12, 2003

(30) Foreign Application Priority Data

Dec. 7, 2001 (JP) ..................................... P.2001-374710
Jan. 25, 2002 (JP) ..................................... P.2002-016823

(51) Int. Cl.[7] ............................................... H02K 7/14
(52) U.S. Cl. ............................. 310/47; 310/43; 310/50; 310/89; 310/90; 310/51
(58) Field of Search ............................. 310/43, 47, 50, 310/90, 89, 51

(56) References Cited

U.S. PATENT DOCUMENTS

| | | | | |
|---|---|---|---|---|
| 3,344,291 A | * | 9/1967 | Pratt | 310/43 |
| 3,693,035 A | * | 9/1972 | Ostwald | 310/51 |
| 4,492,889 A | * | 1/1985 | Fukushi et al. | 310/87 |
| 5,712,518 A | | 1/1998 | Heckele et al. | 310/50 |
| 5,731,646 A | * | 3/1998 | Heinze et al. | 310/89 |
| 5,783,888 A | * | 7/1998 | Yamano | 310/43 |
| 5,864,189 A | * | 1/1999 | Kodaira et al. | 310/89 |
| 5,982,057 A | * | 11/1999 | Imada et al. | 310/43 |
| 6,043,575 A | * | 3/2000 | Ghode et al. | 310/52 |
| 6,429,559 B1 | * | 8/2002 | Severien et al. | 310/89 |
| 2003/0127932 A1 | * | 7/2003 | Ishida et al. | 310/184 |

FOREIGN PATENT DOCUMENTS

| | | | | |
|---|---|---|---|---|
| JP | 02-026203 | 7/1990 | ............ | H02K/5/08 |
| JP | 09-309078 | 12/1997 | ............ | B25F/5/00 |
| JP | 09-314481 | 12/1997 | ............ | B25F/5/00 |
| JP | 2000-262024 | 9/2000 | .......... | H02K/15/12 |
| JP | 2000-301411 | 10/2000 | ............ | H02K/9/06 |

OTHER PUBLICATIONS

English Translation of a Chinese Office Action.
Korean Office Action dated Feb. 25, 2004, with English translation.

* cited by examiner

Primary Examiner—Nestor Ramirez
Assistant Examiner—Jaydi A. Aguirrechea
(74) Attorney, Agent, or Firm—McGinn & Gibb, PLLC

(57) ABSTRACT

In an inexpensive electric tool, a thin insulating layer is provided by pouring an insulating resin material by the injection molding to extend from a rotor supporting portion 1a formed in an outer casing to an inner surface or inner and outer surfaces of the outer casing. Also, as another configuration and method, an insulating piece 12a for covering the inner surface of the rotor supporting portion is provided, and also an insulating block for covering the rotor supporting portion and supporting ribs is provided.

13 Claims, 9 Drawing Sheets

ELECTRIC TOOL AND ITS INSULATING METHOD

BACKGROUND OF THE INVENTION

1. Field of the Invention

The present invention relates to a double insulation structure of an electric tool and its insulating method and, more particularly, to the safety of the operator from the electric leakage and the size reduction of the aluminum outer casing as the grip portion when the metal outer casing is used in the portable electric disk grinder that is widely employed in grinding/polishing operations of the workpiece.

2. Description of the Related Art

As the electric tool in the prior art, the portable electric disk grinder employed widely in grinding/polishing operations of the workpiece, for example, will be explained with reference to FIG. 14 to FIG. 19 hereunder. FIG. 14 is a partially-omitted longitudinally-sectioned side view showing a double insulation type portable electric disk grinder in the prior art, which has an outer casing 15 that is equipped with a motor 2 as a driving source to support rotatably a rotor 2b of the motor 2. FIG. 15 is a sectional view taken along an H—H line in FIG. 14. FIG. 16 is a partially-omitted longitudinally-sectioned side view showing another double insulation type portable electric disk grinder in the prior art, which has a metal bushing 16 in the outer casing 15 that is equipped with the motor 2 as the driving source to support rotatably the rotor 2b of the motor 2. FIG. 17 is a sectional view taken along an I—I line in FIG. 16. FIG. 18 is a partially-omitted longitudinally-sectioned side view showing a single insulation type portable electric disk grinder in the prior art, which has an outer casing 17 that is equipped with the motor 2 as the driving source to support rotatably the rotor 2b of the motor 2. FIG. 19 is a sectional view taken along a J—J line in FIG. 18.

A double insulation type portable electric disk grinder shown in FIG. 14 and FIG. 15 comprises an outer casing 15 formed of insulating resin, a motor 2 including a stator 2a and a rotor 2b installed in this outer casing 15, a bearing 3 for supporting rotatably an end portion of the rotor of the motor 2, a rotor supporting portion 15a formed in the outer casing 15 to support this bearing 3, a carbon brush 4 that contacts electrically a commutator 2c of the rotor 2b, a carbon brush holder 5 fixed to the outer casing 15 to hold the carbon brush 4, a power transmitting gear 6 provided on the opposite side to the commutator 2c of the rotor 2b, and a tip tool such as a grindstone, a disk, or the like connected to an output shaft (not shown) to receive a rotary power from the power transmitting gear 6 via the output shaft. Also, in the above configuration, the reinforced insulation is applied to the carbon brush holder 5 and also the double insulation is applied to the rotor 2b. In addition, the double insulation is achieved by the supplementary insulation of the outer casing 15 in addition to the functional insulation that is applied to the stator 2a and a power supply line 7.

In such configuration, the operator supplies the power to the motor 2 by operating a switch (not shown) to rotate the rotor 2b, and then transmits the rotary power via the power transmitting gear 6 and the output shaft to carry out the grinding/polishing operations of the workpiece.

In this case, since the outer casing 15 that is gripped by the operator is formed of the insulating resin material, the double insulation can be easily achieved and also the creeping distance to cause a short circuit can be prolonged even if the metal powders (dusts) are produced continuously when the conductive material such as the metal is worked. Therefore, the safety of the operator from the electric leakage can be assured.

However, according to the above configuration, the rotor supporting portion 15a is heated by the deterioration of the lubricating oil, the fracture, etc. of the bearing 3 in addition to the heat that is generated in the charging portions of the stator 2a and the rotor 2b and the yoke. Therefore, there is the drawback that, when such increase in the temperature exceeds the heat resisting temperature of the outer casing 15, the rotor supporting portion 15a and its periphery of the outer casing 15 is thermally deformed. Also, the high heat generated due to the degradation of rectification is transmitted to the outer casing 15 from the carbon brush 4 via the carbon brush holder 5. Therefore, there is the drawback that, when such increase in the temperature exceeds the heat resisting temperature of the outer casing 15, the outer casing 15 around the carbon brush holder 5 is thermally deformed. In this manner, if the outer casing 15 is thermally deformed, there are the problems that the rotor supporting portion 15a of the outer casing 15 cannot support firmly the bearing 3, which supports rotatably the rotor 2b, to cause the reduction in the performance of the motor 2 and that the outer casing 15 is ready to deform or break by the external impact generated when the above grinder is dropped down by mistake, etc. In this case, in order to overcome these problems, such outer casing 15 must be replaced with a new outer casing 15.

Also, a double insulation type portable electric disk grinder shown in FIG. 16 and FIG. 17 comprises the outer casing 15 formed of the insulating resin, the motor 2 including the stator 2a and the rotor 2b installed in this outer casing 15, the bearing 3 for supporting rotatably the end portion of the rotor of the motor 2, the rotor supporting portion 15a formed in the outer casing 15 to support this bearing 3, a metal bushing 16 provided between the rotor supporting portion 15a and the bearing 3, the carbon brush 4 that contacts electrically the commutator 2c of the rotor 2b, the carbon brush holder 5 fixed to the outer casing 15 to hold the carbon brush 4, the power transmitting gear 6 provided on the opposite side to the commutator 2c of the rotor 2b, and the tip tool such as the grindstone, the disk, or the like connected to the output shaft (not shown) to receive the rotary power from the power transmitting gear 6 via the output shaft. Also, in the above configuration, the reinforced insulation is applied to the carbon brush holder 5 and also the double insulation is applied to the rotor 2b. In addition, the double insulation is achieved by the supplementary insulation of the outer casing 15 in addition to the functional insulation that is applied to the stator 2a and a power supply line 7. Further, the metal bushing 16 that can radiate the heat, which is generated in the charging portions of the stator 2a and the rotor 2b and the yoke, as well as the heat, which is generated by the deterioration of the lubricating oil, the fracture, etc. of the bearing 3, to some extent is provided. As a result, the thermal deformation around the rotor supporting portion 15a of the outer casing 15 can be suppressed.

In such configuration, the operator supplies the power to the motor 2 by operating a switch (not shown) to rotate the rotor 2b, and then transmits the rotary power via the power transmitting gear 6 and the output shaft to carry out the grinding/polishing operations of the workpiece.

In this case, since the outer casing 15 that is gripped by the operator is formed of the insulating resin material, the double insulation can be easily achieved and also the creeping distance to cause a short circuit can be prolonged even if the metal powders (dusts) are produced continuously when the conductive material such as the metal is worked. Therefore, the safety of the operator from the electric leakage can be assured.

However, according to the above configuration, there is the similar problem that, when the heat that exceeds an amount of heat radiation of the metal bushing 16 is generated, the increase in the temperature exceeds the heat resisting temperature of the insulating resin and thus the thermal deformation of the outer casing 15 is brought about.

Also, a single insulation type portable electric disk grinder shown in FIG. 18 and FIG. 19 comprises an outer casing 17 formed of conductive material such as metal (aluminum), or the like, the motor 2 including the stator 2a and the rotor 2b installed in this outer casing 17, the bearing 3 for supporting rotatably the end portion of the rotor of the motor 2, a rotor supporting portion 17a formed in the outer casing 17 to support this bearing 3, the carbon brush 4 that contacts electrically the commutator 2c of the rotor 2b, the carbon brush holder 5 fixed to the outer casing 17 to hold the carbon brush 4, the power transmitting gear 6 provided on the opposite side to the rotor 2b, and the tip tool such as the grindstone, the disk, or the like connected to the output shaft (not shown) to receive the rotary power from the power transmitting gear 6 via the output shaft. Also, in the above configuration, the reinforced insulation is applied to the carbon brush holder 5 and also the single insulation is achieved by the functional insulation that is applied to the stator 2a, the rotor 2b, and the power supply line 7.

In such configuration, the operator supplies the power to the motor 2 by operating a switch (not shown) to rotate the rotor 2b, and then transmits the rotary power via the power transmitting gear 6 and the output shaft to carry out the grinding/polishing operations of the workpiece.

Thus, since the outer casing 17 that is gripped by the operator is formed of the conductive material such as the metal, the heat can be radiated from a surface of this outer casing 17 even when the rotor supporting portion 17a is heated by the deterioration of the lubricating oil, the fracture, etc. of the bearing 3 in addition to the heat that is generated in the charging portions of the stator 2a and the rotor 2b and the yoke, or the high heat generated due to the degradation of rectification is transmitted to the outer casing 17 from the carbon brush 4 via the carbon brush holder 5. Therefore, the thermal deformation of the outer casing 17 can be suppressed. Accordingly, the bearing 3 that supports rotatably the rotor 2b can be held without fail by the rotor supporting portion 17a of the outer casing 17, and also the outer casing 17 becomes hard to deform or break by the external impact generated when the above grinder is dropped down in error, etc.

However, according to the above configuration, there is the problem that, if the metal powders are produced continuously when the conductive material such as the metal is worked, the safety from the electric leakage is lowered since the creeping distance to cause the short circuit is short.

In the configurations of the double insulation type portable electric disk grinders shown in FIG. 14 to FIG. 17, as described above, the rotor supporting portion is heated by the deterioration of the lubricating oil, the fracture, etc. of the bearing in addition to the heat that is generated in the charging portions of the stator and the rotor and the yoke. Therefore, there is the drawback that, when such increase in the temperature exceeds the heat resisting temperature of the outer casing, the rotor supporting portion and its periphery of the outer casing is thermally deformed. Also, the high heat generated due to the degradation of rectification is transmitted to the outer casing from the carbon brush via the carbon brush holder. Therefore, there is the drawback that, when such increase in the temperature exceeds the heat resisting temperature of the outer casing, the outer casing around the carbon brush holder is thermally deformed. In this way, if the outer casing is thermally deformed, there are the problems that the rotor supporting portion of the outer casing cannot support firmly the bearing, which supports rotatably the rotor, to cause the reduction in the performance of the motor and that the outer casing is ready to deform or break by the external impact generated when the above grinder is dropped down by mistake, etc. In this case, since such outer casing must be replaced with the new outer casing to overcome these problems, there are caused the drawbacks that the burden is imposed on the operator in respect of the operation or the expense and that the effective utilization of the resource cannot be attained.

Also, according to the configuration of the single insulation type portable electric disk grinder shown in FIG. 18 and FIG. 19, there is the problem that, if the metal powders are produced continuously when the conductive material such as the metal is worked, as described above, the safety from the electric leakage is lowered since the creeping distance to cause the short circuit is short.

SUMMARY OF THE INVENTION

It is an object of the present invention to overcome the above problems, and to provide an inexpensive electric tool having the double insulation that is capable of assuring the heat resistance and the physical durability of the outer casing, is excellent in the safety from the electric leakage, and is capable of achieving the size reduction in the outer shape of the outer casing.

The above object can be attained by providing an electric tool having an outer casing made of metal, a motor including a stator and a rotor installed in the outer casing, a bearing for supporting rotatably the rotor of the motor, and a rotor supporting portion formed in the outer casing to support the bearing, which comprises an insulating portion provided along an inner surface of the outer casing from the rotor supporting portion.

The above object can be attained by providing an electric tool having an outer casing made of metal, a motor including a stator and a rotor installed in the outer casing, a bearing for supporting rotatably the rotor of the motor, and a rotor supporting portion formed in the outer casing to support the bearing, which comprises insulating portions provided along inner and outer surfaces of the outer casing from the rotor supporting portion.

The above object can be attained by providing an electric tool having an outer casing made of metal, a motor including a stator and a rotor installed in the outer casing, a bearing for supporting rotatably the rotor of the motor, and a rotor supporting portion formed in the outer casing to support the bearing, which comprises two insulating members formed of insulating resin material or more are provided to the outer casing so as to cover an inner surface of the outer casing and a periphery of the rotor supporting portion.

The above object can be attained by providing an insulating method of an electric tool having a rotor supporting portion formed in a metal outer casing in order to support a bearing that supports rotatably a rotor of a motor, which consists of a stator and the rotor installed in the metal outer casing, which comprises a first step of supporting the metal outer casing at a predetermined position by a plurality of molds that have a strength not to deform the metal outer casing; a second step of pouring a melted insulating resin material into insides of the molds via an injection port under certain conditions; and a third step of forming insulating layers between the molds and the metal outer casing.

DETAILED DESCRIPTION OF THE PREFERRED EMBODIMENTS

Figure 1:
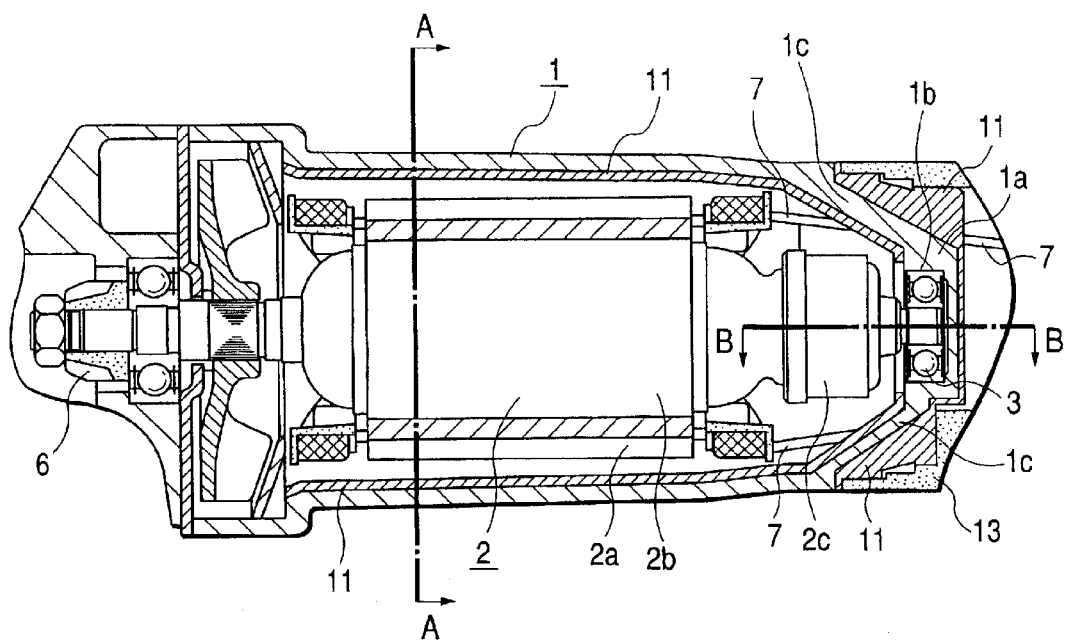
FIG. 1 is a partially-omitted longitudinally-sectioned side view showing an embodiment of a double insulation type portable electric disk grinder according to the present invention, which has an outer casing that is equipped with a motor as a driving source to support rotatably a rotor of the motor.
Figure 2:
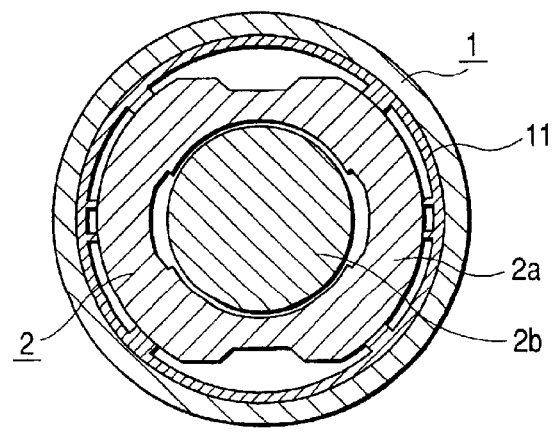
FIG. 2 is a sectional view taken along an A—A line in FIG. 1.
Figure 3:
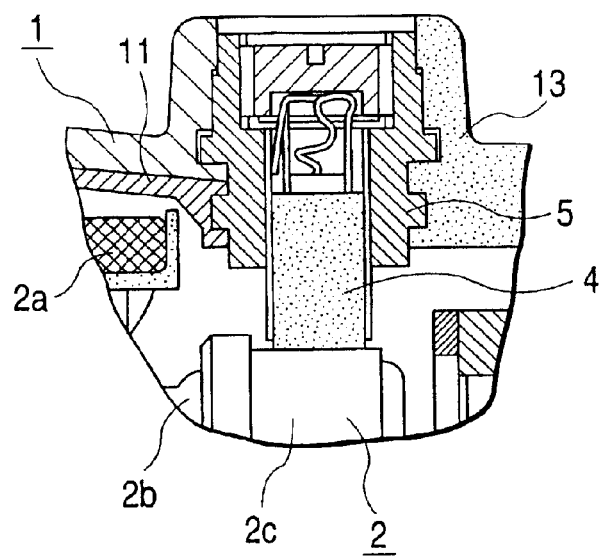
FIG. 3 is a sectional view taken along a B—B line in FIG. 1.
Figure 4:
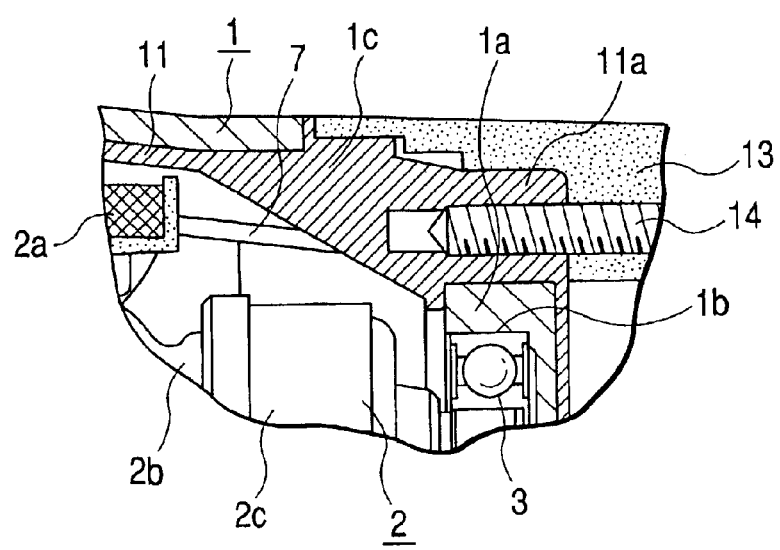
FIG. 4 is a longitudinally-sectioned side view showing a screw portion around a bearing in a tail cover that is fitted to the outer casing in FIG. 1.
Figure 5:
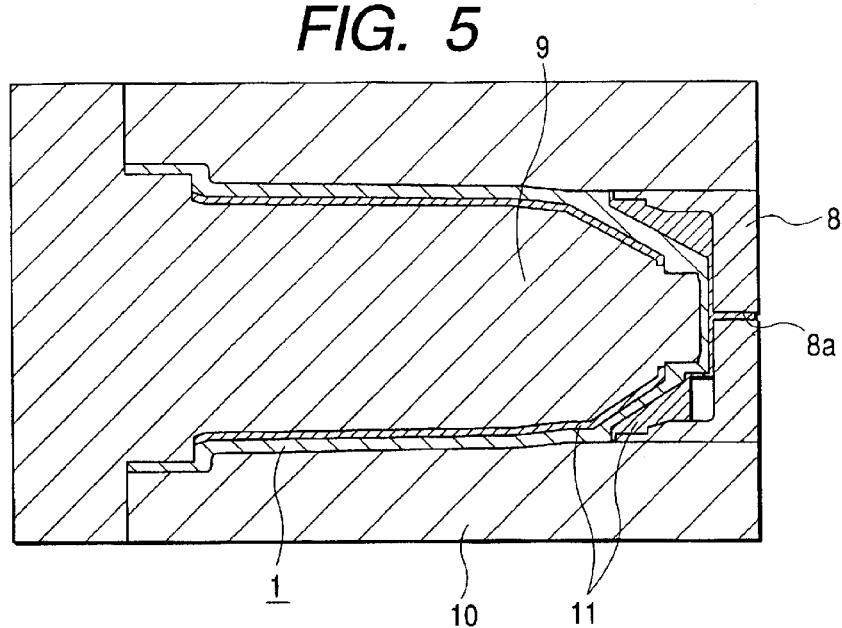
FIG. 5 is a schematic configurative view showing the state that insulating layers are provided onto a rotor supporting portion and supporting ribs, except the inside of the outer casing and a bearing portion, of the present invention by the injection molding.
Figure 6:
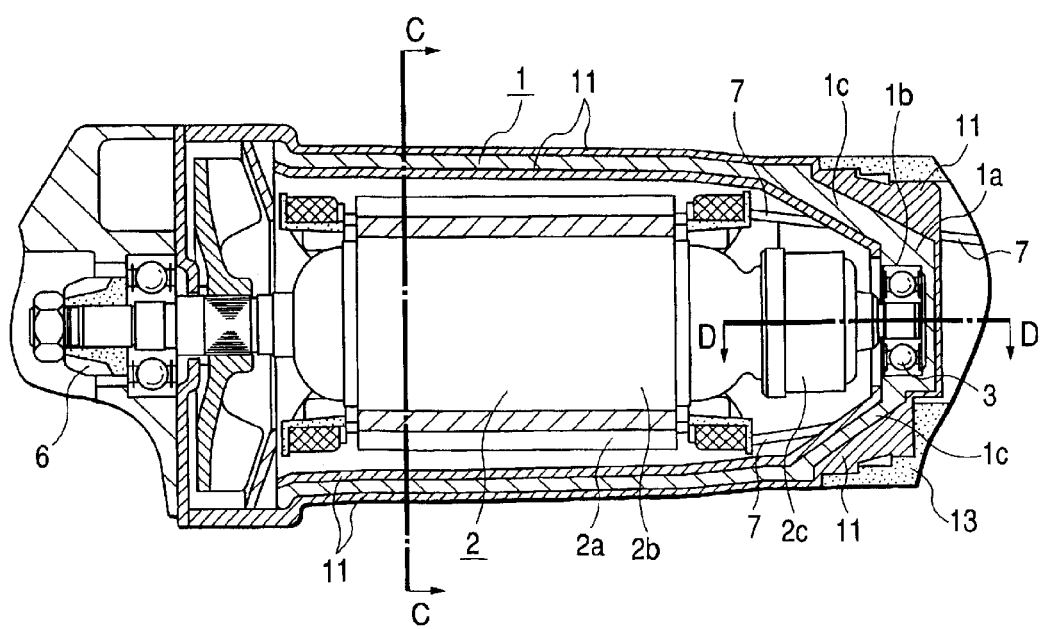
FIG. 6 is a partially-omitted longitudinally-sectioned side view showing another embodiment of a double insulation type portable electric disk grinder according to the present invention, which has an outer casing that is equipped with a motor as a driving source to support rotatably a rotor of the motor.
Figure 7:
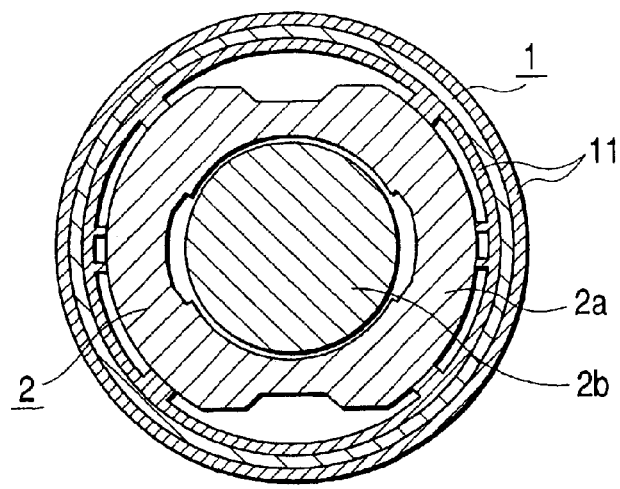
FIG. 7 is a sectional view taken along a C—C line in FIG. 6.
Figure 8:
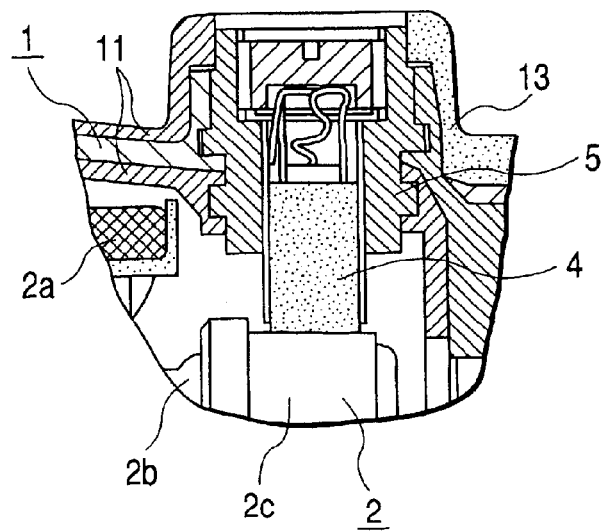
FIG. 8 is a sectional view taken along a D—D line in FIG. 6.
Figure 9:
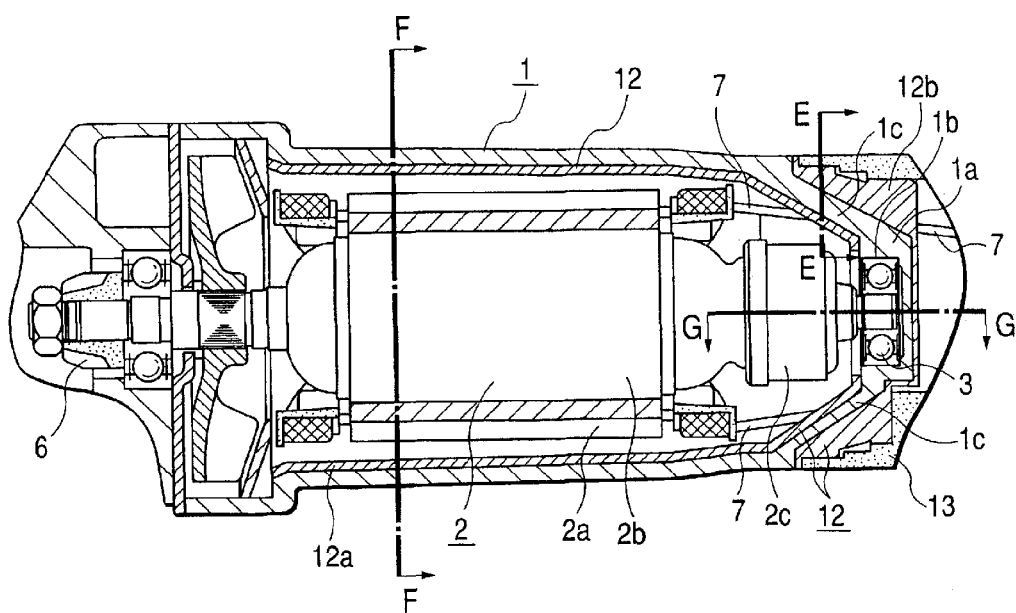
FIG. 9 is a partially-omitted longitudinally-sectioned side view showing still another embodiment of a double insulation type portable electric disk grinder according to the present invention, which has an outer casing that is equipped with a motor as a driving source to support rotatably a rotor of the motor.
Figure 10:
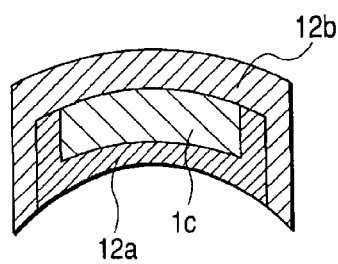
FIG. 10 is a sectional view taken along an E—E line in FIG. 9.
Figure 11:
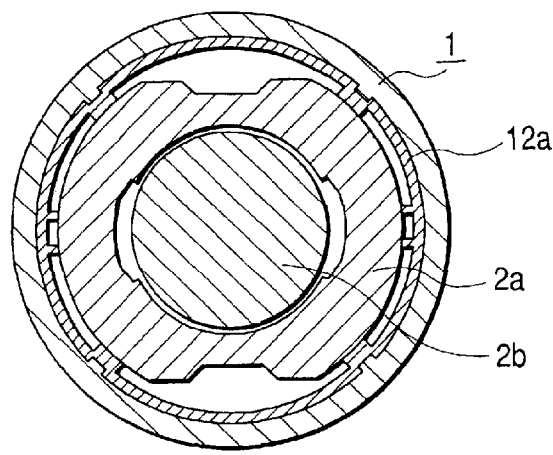
FIG. 11 is a sectional view taken along an F—F line in FIG. 9.
Figure 12:
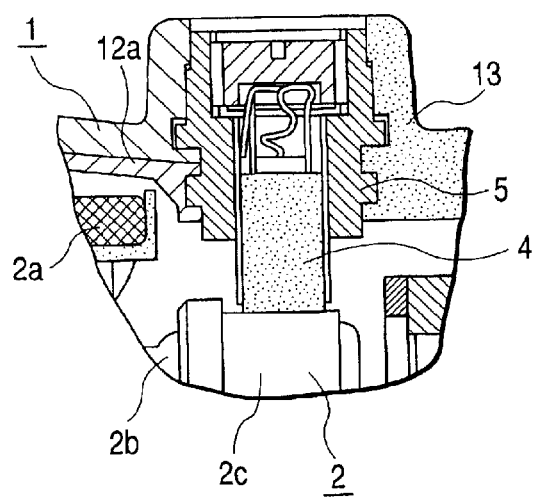
FIG. 12 is a sectional view taken along a G—G line in FIG. 9.
Figure 13:
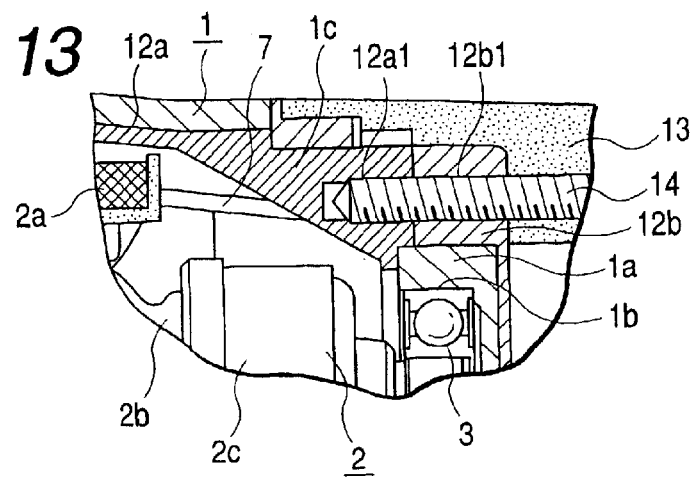
FIG. 13 is a longitudinally-sectioned side view showing screw portions around a bearing in a tail cover that is fitted to the outer casing in FIG. 9.
Figure 14:
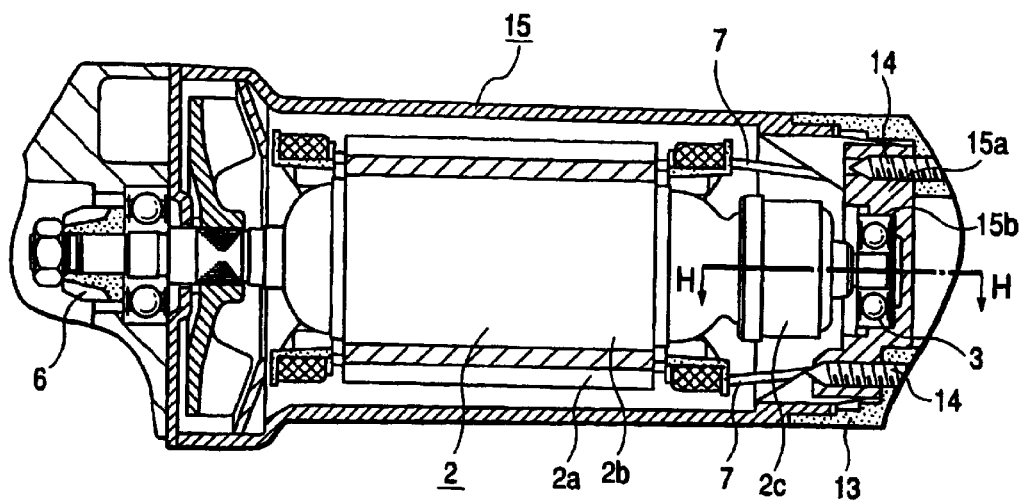
FIG. 14 is a partially-omitted longitudinally-sectioned side view showing a double insulation type portable electric disk grinder in the prior art, which has an outer casing that is equipped with a motor as a driving source to support rotatably a rotor of the motor.
Figure 15:
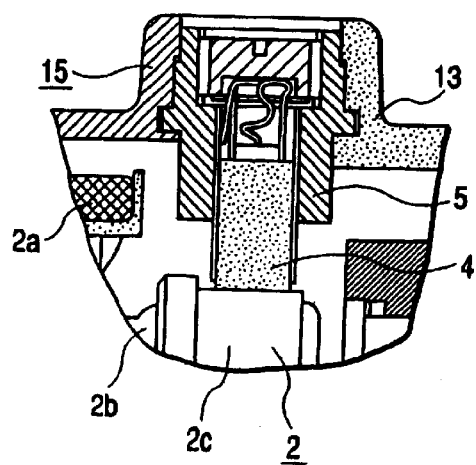
FIG. 15 is a sectional view taken along an H—H line in FIG. 14.
Figure 16:
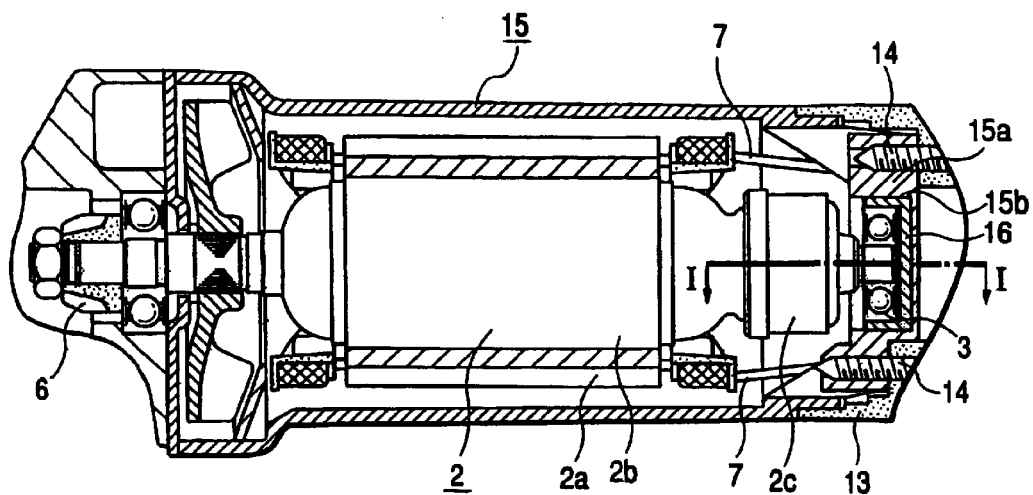
FIG. 16 is a partially-omitted longitudinally-sectioned side view showing another double insulation type portable electric disk grinder in the prior art, which has a metal bushing in an outer casing that is equipped with a motor as a driving source to support rotatably a rotor of the motor.
Figure 17:
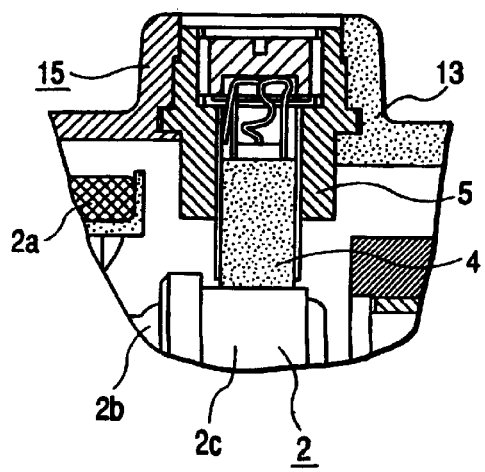
FIG. 17 is a sectional view taken along an I—I line in FIG. 16.
Figure 18:
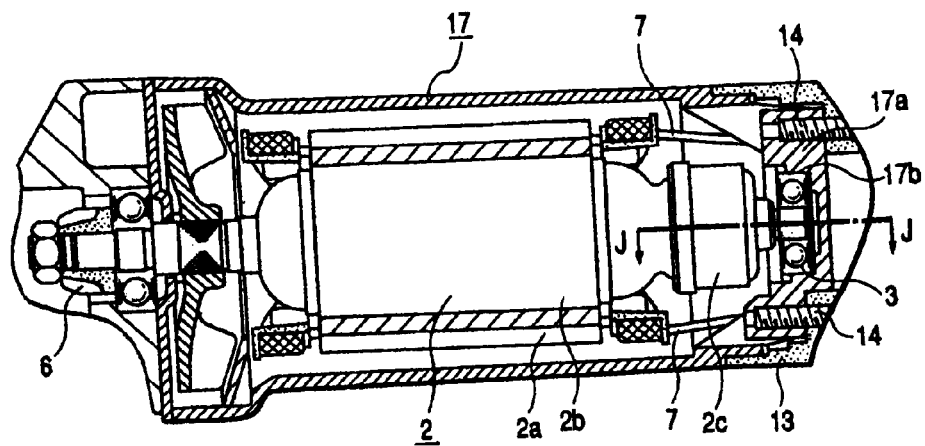
FIG. 18 is a partially-omitted longitudinally-sectioned side view showing a single insulation type portable electric disk grinder in the prior art, which has an outer casing that is equipped with a motor as a driving source to support rotatably a rotor of the motor.
Figure 19:
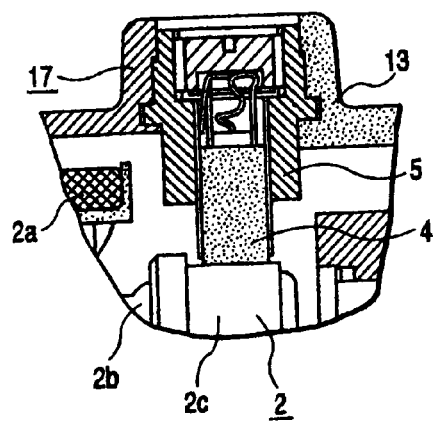
FIG. 19 is a sectional view taken along a J—J line in FIG. 18.

A double insulation type portable electric disk grinder according to the present embodiment will be explained with reference to FIG. 1 to FIG. 13 hereunder. FIG. 1 is a partially-omitted longitudinally-sectioned side view showing an embodiment of a double insulation type portable electric disk grinder according to the present invention, which has an outer casing 1 that is equipped with a motor 2 as a driving source to support rotatably a rotor 2b of the motor 2. FIG. 2 is a sectional view taken along an A—A line in FIG. 1. FIG. 3 is a sectional view taken along a B—B line in FIG. 1. FIG. 4 is a longitudinally-sectioned side view showing a screw portion 11a around a bearing in a tail cover 13 that is fitted to the outer casing 1 in FIG. 1. FIG. 5 is a schematic configurative view showing the state that insulating layers 11 are provided onto a rotor supporting portion 1a and supporting ribs 1c, except the inside of the outer casing 1 and a bearing portion 1b, of the present invention by the injection molding. FIG. 6 is a partially-omitted longitudinally-sectioned side view showing another embodiment of a double insulation type portable electric disk grinder according to the present invention, which has the outer casing 1 that is equipped with the motor 2 as the driving source to support rotatably the rotor 2b of the motor 2. FIG. 7 is a sectional view taken along a C—C line in FIG. 6. FIG. 8 is a sectional view taken along a D—D line in FIG. 6. FIG. 9 is a partially-omitted longitudinally-sectioned side view showing still another embodiment of a double insulation type portable electric disk grinder according to the present invention, which has the outer casing 1 that is equipped with the motor 2 as the driving source to support rotatably the rotor 2b of the motor 2. FIG. 10 is a sectional view taken along an E—E line in FIG. 9. FIG. 11 is a sectional view taken along an F—F line in FIG. 9. FIG. 12 is a sectional view taken along a G—G line in FIG. 9. FIG. 13 is a longitudinally-sectioned side view showing screw portions 12a1, 12b1 around the bearing in the tail cover 13 that is fitted to the outer casing 1 in FIG. 9.

A double insulation type portable electric disk grinder shown in FIG. 1 to FIG. 5 comprises an outer casing (housing) 1 formed of conductive material such as metal (aluminum), or the like, the motor 2 including the stator 2a and the rotor 2b installed in this outer casing 1, the bearing 3 for supporting rotatably the end portion of the rotor of the motor 2, a rotor supporting portion 1a formed in the outer casing 1 to support this bearing 3, the carbon brush 4 that contacts electrically the commutator 2c of the rotor 2b, the carbon brush holder 5 fixed to the outer casing 1 to hold the carbon brush 4, the power transmitting gear 6 provided on the opposite side to the rotor 2b, the tip tool such as the grindstone, the disk, or the like connected to the output shaft (not shown) to receive the rotary power from the power transmitting gear 6 via the output shaft, a switch (not shown) for controlling the power supply to the motor 2, and a tail cover 13 in which the switch, a power supply line (lead wire) 7, etc. are housed.

Also, an insulating portion (insulating layer) 11 formed of insulating resin material is provided on an inner surface (inside of an inner peripheral surface) of the outer casing 1, which is fabricated previously, and on outer surfaces of a rotor supporting portion 1a except a bearing portion 1b, into which the bearing 3 is press-fitted, and supporting ribs 1c of the rotor supporting portion 1a by the injection molding method in the form to cover them. This injection molding method is carried out, as shown in FIG. 5, in the situation that the outer casing 1 is supported at a predetermined position by plural molds (three molds 8, 9, 10 in the present embodiment) that has the strength not to deform the outer casing 1. First, the mold 8 and the mold 9 are arranged in the mold 10, and then the melted insulating resin material is poured from the mold 8 into the mold 9 through an injection port 8a of the mold 8 under certain conditions to thus form the insulating layer 11 between the mold 8 and the outer casing 1. Then, the insulating resin material flows through spaces between plural supporting ribs 1c provided on the mold 9 to thus form the insulating layer 11 between the mold 9 and the outer casing 1, i.e., on the inner surface of the outer casing 1.

Also, in the above configuration, the reinforced insulation is applied to the carbon brush holder 5 and also the functional insulation is applied to the stator 2a, the rotor 2b, and the power supply line 7 respectively. In this manner, since the supplementary insulation of the electric portions is applied perfectly, the double insulation can be realized. Thus, because the metal outer casing 1 can be employed, the heat resistance and the physical durability can be assured. In other words, since the heat that is generated in the charging portions of the stator 2a and the rotor 2b and the yoke and the heat that is generated by the deterioration of the lubricating oil, the fracture, etc. of the bearing 3 can be transmitted to the outer casing 1 from the rotor supporting portion 1a via the supporting ribs 1c of the supporting portion, the overall surface of this outer casing 1 can function as the heat sink to get the large heat radiating capability, and therefore the thermal deformation of the insulating layer 11 can be prevented. Also, since the high heat generated due to the degradation of rectification can be transmitted to the outer casing 1 from the carbon brush 4 via the carbon brush holder 5 and the radiated from the surface of the outer casing 1, the thermal deformation of the insulating layer 11 can be prevented like the above and also the event that the increase in the temperature exceeds the heat resisting temperature and thus the outer casing 1 is thermally deformed is never caused because such outer casing 1 is formed of the metal. As a result, not only the effective utilization of the resource can be achieved since the exchange of the outer casing 1 is not needed and thus the outer casing 1 can be employed again and again, but also the deformation or the breaking of the outer casing 1 caused by the external impact, that is generated when the above grinder is dropped down, etc. can be suppressed since the outer casing 1 has the large mechanical strength. Moreover, in the present invention, even if the metal powders (dusts) are generated continuously on the job site when the conductive material such as the metal is worked, the lapsed time required until the metal powders are entered, adhered, and deposited to result in the reduction in the insulation level can be expanded since the creeping distance between the charging portions of the stator 2a and the rotor 2b and the outer casing 1 to cause the short circuit is prolonged because of the above double insulation. Besides, even if such reduction in the insulation level is caused, the resistance value is increased in proportion to the expanded distance and thus the leakage current can be suppressed smaller, and as a result the safety of the operator from the electric leakage due to the short circuit of the outer casing 1 can be assured substantially sufficiently. On the contrary, in the prior art, if the metal powders are sucked continuously together with the air when the cooling air is sucked via air slits provided in the outer casing 1 by the fan operation to cool the motor 2, such a disadvantage is brought about that the insulating property of the charging portions is lowered since the metal powders are entered, adhered, and deposited onto minute clearance portions along the abutted boundary surfaces (creeping distances) among the outer casing 1, the tail cover 13, the carbon brush holder 5, etc. with the aid of the vibration of the main body.

In addition, like the present embodiment, if the insulating layer 11 is provided onto the outer casing 1 by the injection molding, a thickness of the insulating layer 11 formed on the outer casing 1, into which the stator 2a is press-fitted, can be reduced (minimum thickness). Therefore, an outer diameter of the outer casing 1 that is held by the operator (an outer diameter of a grip portion) can be reduced and as a result the compact double insulation type portable electric disk grinder can be provided. Also, unlike the configuration of another double insulation type portable electric disk grinder explained hereinafter with reference to FIG. 9 to FIG. 13, since the insulating layer 11 is provided onto the outer casing 1 by the injection molding, the operation of fitting a plurality of insulating members made of the insulating resin material into the outer casing 1 can be eliminated. As a consequence, not only the improvement in the assembling efficiency can be achieved but also the cost reduction can be achieved by the reduction in the number of parts.

Also, as shown in FIG. 4, in case the tail cover 13 in which the switch is fitted is provided to the outer casing 1 on the opposite side to the tip tool, such tail cover 13 can be fitted easily to the outer casing 1 by providing screwed holes 11a in the above insulating layer 11 and then executing the operation of tightening tapping screws 14 into the screwed holes 11a. Therefore, the tapping that is required when the tail cover 13 is fitted directly to the metal outer casing 1 can be eliminated, and thus the machining cost can be reduced.

In this case, the double insulation type portable electric disk grinder constructed as above is employed in the grinding/polishing operations of the workpiece by rotating the rotor 2b by operating the switch (not shown) to supply the power to the motor 2, then transmitting the rotary power to the power transmitting gear 6 provided to the rotor 2b, and then rotating the tip tool such as the grindstone, the disk, or the like being connected to the output shaft having the gear (not shown) that engages with the power transmitting gear 6.

In the above double insulation type portable electric disk grinder shown in FIG. 1 to FIG. 5, the insulating layer 11 is provided on the inside of the outer casing 1 by the injection molding. In this case, like a double insulation type portable electric disk grinder shown in FIG. 6 to FIG. 8, if the insulating portions (insulating layers) 11 made of the insulating resin material are provided onto the inner and outer surfaces (inner and outer peripheral sides) of the outer casing 1, which is formed the conductive material such as the metal (aluminum), by the injection molding, the similar effect can also be achieved. In other words, since the metal outer casing 1 is employed to assure the heat resistance and the physical durability, the thermal deformation of the outer casing 1 can be prevented. As a result, not only the effective utilization of the resource can be achieved since the exchange of the outer casing 1 is not needed and thus the outer casing 1 can be employed again and again, but also the deformation or the breaking of the outer casing 1 caused by the external impact, that is generated when the above grinder is dropped down, etc. can be suppressed since the outer casing 1 has the large mechanical strength. Moreover, in the present invention, even if the metal powders (dusts) are generated continuously on the job site when the conductive material such as the metal is worked, the lapsed time required until the metal powders are entered, adhered, and deposited to result in the reduction in the insulation level can be expanded since the creeping distance between the charging portions of the stator 2a and the rotor 2b and the outer casing 1 to cause the short circuit is prolonged because of the above double insulation. Besides, even if such reduction in the insulation level is caused, the resistance value is increased in proportion to the expanded distance and thus the leakage current can be suppressed smaller, and as a result the safety of the operator from the electric leakage due to the short circuit of the outer casing 1 can be assured substantially sufficiently. On the contrary, in the prior art, if the metal powders are sucked continuously together with the air when the cooling air is sucked via air slits provided in the outer casing 1 by the fan operation to cool the motor 2, such a disadvantage is brought about that the insulating property of the charging portions is lowered since the metal powders are entered, adhered, and deposited onto minute clearance portions along the abutted boundary surfaces (creeping distances) among the outer casing 1, the tail cover 13, the carbon brush holder 5, etc. with the aid of the vibration of the main body. In addition, like the present embodiment, if the insulating layer 11 is provided onto the outer casing 1 by the injection molding, a thickness of the insulating layer 11 formed on the outer casing 1, into which the stator 2a is press-fitted, can be reduced (minimum thickness). Therefore, an outer diameter of the outer casing 1 that is held by the operator (an outer diameter of a grip portion) can be reduced and as a result the compact double insulation type portable electric disk grinder can be provided. Also, unlike the configuration of another double insulation type portable electric disk grinder explained hereinafter with reference to FIG. 9 to FIG. 13, since the insulating layer 11 is provided onto the outer casing 1 by the injection molding, the operation of fitting a plurality of insulating members made of the insulating resin material into the outer casing 1 can be eliminated. As a consequence, not only the improvement in the assembling efficiency can be achieved but also the cost reduction can be achieved by the reduction in the number of parts.

Next, still another embodiment of a double insulation type portable electric disk grinder will be explained with reference to FIG. 9 to FIG. 13 hereunder. The double insulation type portable electric disk grinder shown in FIG. 9 to FIG. 13 comprises the outer casing (housing) 1 formed of the conductive material such as the metal (aluminum), or the like, the motor 2 including the stator 2a and the rotor 2b installed in this outer casing 1, the bearing 3 for supporting rotatably the end portion of the rotor of the motor 2, the rotor supporting portion 1a formed in the outer casing 1 to support this bearing 3, the carbon brush 4 that contacts electrically the commutator 2c of the rotor 2b, the carbon brush holder 5 fixed to the outer casing 1 to hold the carbon brush 4, the power transmitting gear 6 provided on the opposite side to the rotor 2b, the tip tool such as the grindstone, the disk, or the like connected to the output shaft (not shown) to receive the rotary power from the power transmitting gear 6 via the output shaft, the switch (not shown) for controlling the power supply to the motor 2, and the tail cover 13 in which the switch, a power supply line (lead wire) 7, etc. are housed.

Also, insulating members 12 (an insulating piece 12a, an insulating block 12b) formed of a plurality of insulating resin materials, which are fabricated individually, are incorporated into the outer casing 1 that is previously fabricated. The inner surface of the outer casing 1 is covered with the insulating piece 12a, while the rotor supporting portion 1a except the bearing portion 1b, which is press-fitted into the bearing 3, and the supporting ribs 1c of the rotor supporting portion 1a are covered with the insulating block 12b to sandwich them.

Also, in the above configuration, the reinforced insulation is applied to the carbon brush holder 5 and also the functional insulation is applied to the stator 2a, the rotor 2b, and the power supply line 7 respectively. In this manner, since the supplementary insulation of the electric portions is applied perfectly, the double insulation can be realized. Thus, because the metal outer casing 1 can be employed, the heat resistance and the physical durability can be assured. In other words, since the heat that is generated in the charging portions of the stator 2a and the rotor 2b and the yoke and the heat that is generated by the deterioration of the lubricating oil, the fracture, etc. of the bearing 3 can be transmitted to the outer casing 1 from the rotor supporting portion 1a via the supporting ribs 1c of the supporting portion, the overall surface of this outer casing 1 can function as the heat sink to get the large heat radiating capability, and therefore the thermal deformation of the insulating piece 12a and the insulating block 12b can be prevented. Also, since the high heat generated due to the degradation of rectification can be transmitted to the outer casing 1 from the carbon brush 4 via the carbon brush holder 5 and the radiated from the surface of the outer casing 1, the thermal deformation of the insulating piece 12a and the insulating block 12b can be prevented like the above and also the event that the increase in the temperature exceeds the heat resisting temperature and thus the outer casing 1 is thermally deformed is never caused because such outer casing 1 is formed of the metal. As a result, not only the effective utilization of the resource can be achieved since the exchange of the outer casing 1 is not needed and thus the outer casing 1 can be employed again and again, but also the deformation or the breaking of the outer casing 1 caused by the external impact, that is generated when the above grinder is dropped down, etc. can be suppressed since the outer casing 1 has the large mechanical strength. Moreover, in the present invention, even if the metal powders (dusts) are generated continuously on the job site when the conductive material such as the metal is worked, the lapsed time required until the metal powders are entered, adhered, and deposited to result in the reduction in the insulation level can be expanded since the creeping distance between the charging portions of the stator 2a and the rotor 2b and the outer casing 1 to cause the short circuit is prolonged because of the above double insulation. Besides, even if such reduction in the insulation level is caused, the resistance value is increased in proportion to the expanded distance and thus the leakage current can be suppressed smaller, and as a result the safety of the operator from the electric leakage due to the short circuit of the outer casing 1 can be assured substantially sufficiently. On the contrary, in the prior art, since the metal powders are entered, adhered, and deposited onto the portions along the abutted boundary surfaces (creeping distances) among the outer casing 1, the tail cover 13, the carbon brush holder 5, etc., the insulating property of the charging portions is lowered.

Also, as shown in FIG. 13, in case the tail cover 13 in which the switch, etc. are fitted is provided to the outer casing 1 on the opposite side to the tip tool, such tail cover 13 can be fitted easily to the outer casing 1 merely by providing screwed holes 12a1, 12b1 in the insulating piece 12a and the insulating block 12b respectively and then executing the operation of tightening the tapping screws 14 into the screwed holes 12a1, 12b1. Therefore, the tapping that is required when the tail cover 13 is fitted directly to the metal outer casing 1 can be eliminated, and thus the machining cost can be reduced.

In this case, the double insulation type portable electric disk grinder constructed as above is employed in the grinding/polishing operations of the workpiece by rotating the rotor 2b by operating the switch (not shown) to supply the power to the motor 2, then transmitting the rotary power to the power transmitting gear 6 provided to the rotor 2b, and then rotating the tip tool such as the grindstone, the disk, or the like being connected to the output shaft having the gear (not shown) that engages with the power transmitting gear 6.

With the above, according to the double insulation structure shown in FIG. 1 to FIG. 13, since the metal outer casing 1 is covered with the insulating layer 11 or two insulating members 12 made of the insulating resin material, not only the heat resistance and the physical durability can be assured but also the safety from the electric leakage can be assured. In addition, when the insulating piece 12a as the stator insulating parts is inserted into the outer casing 1, the certain proper strength must be provided to the insulating piece 12a to insert it, and thus the thickness of the insulating piece 12a is increased inevitably. In this case, if the insulating layer 11 is provided by the injection molding, there is no necessity that the thickness of the insulating piece 12a should be set with respect to the strength to insert it, and thus the minimum thickness required for the insulation can be employed. Accordingly, the inexpensive double insulation type portable electric disk grinder, the outer diameter of the outer casing 1 of which can be designed compact, can be provided.

Here, in the above embodiments, the structure and the method for providing the insulating layer 11 to the outer casing 1 by the injection molding and also the structure and the method for providing the insulating piece 12a and the insulating block 12b as the insulating members 12, which are fabricated individually, to the outer casing 1 are explained. As other structure and other method, the structure in which the insulating layer 11 is provided to the inside of the outer casing 1 by the injection molding and also the rotor supporting portion 1a except the bearing portion 1b, which is press-fitted into the bearing 3, and the supporting ribs 1c of the rotor supporting portion 1a are covered with the insulating block 12b to sandwich them, for example, may be employed by combining them. In addition, the insulation is provided by two insulating members 12 including the insulating piece 12a and the insulating block 12b, but such insulation is not limited particularly to two insulating members 12. The insulation may be provided by using two insulating members 12 or more. Also, in the above embodiments, the present technology is explained based on the double insulation type portable electric disk grinder. But the present technology is not limited to the above product, and such present technology is widely utilized in other electric tools. In particular, the present technology is applicable to the electric tools that have the cylindrical outer casing 1. It maybe guessed that the present technology can be applied to the sanding machine, the polisher, the drill, the hammer, the hammer drill, etc.

According to the present invention, the insulating portion extending from the rotor supporting portion to the inner surface of the outer casing is provided. Therefore, the inexpensive electric tool having the double insulation that is capable of assuring the heat resistance and the physical durability of the outer casing, is excellent in the safety from the electric leakage, and is capable of achieving the size reduction in the outer shape of the outer casing can be provided.

Also, according to the present invention, the insulating portion extending from the rotor supporting portion to the inner and outer surfaces of the outer casing is provided. Therefore, the inexpensive electric tool having the double insulation that is capable of assuring the heat resistance and the physical durability of the outer casing, is excellent in the safety from the electric leakage, and is capable of achieving the size reduction in the outer shape of the outer casing can be provided.

Also, according to the present invention, two insulating members or more formed of the insulating resin material are provided to the outer casing to cover the inner surface of the outer casing and the periphery of the rotor supporting portion. Therefore, the inexpensive electric tool having the double insulation that is capable of assuring the heat resistance and the physical durability of the outer casing and is excellent in the safety from the electric leakage can be provided.

Also, according to the present invention, the insulating portions are formed by the first step of supporting the metal outer casing at the predetermined position by a plurality of molds that have the strength not to deform the metal outer casing, the second step of pouring the melted insulating resin material into insides of the molds via the injection port under certain conditions, and the third step of forming the insulating layer between the molds and the metal outer casing. Therefore, the inexpensive electric tool having the double insulation that is capable of assuring the heat resistance and the physical durability of the outer casing, is excellent in the safety from the electric leakage, and is capable of achieving the size reduction in the outer shape of the outer casing can be provided.

What is claimed is:

1. An electric tool comprising:
   a metal outer casing;
   a motor comprising a stator and a rotor in the outer casing;
   a bearing rotatably supporting the rotor;
   a rotor supporting portion formed in the outer casing and directly supporting the bearing; and
   a continuously molded insulating layer provided on substantially an entirety of an inner surface of the metal outer casing, wherein the insulating layer covers the entire inner surface of the outer casing and the periphery of the rotor supporting portion.

2. The electric tool of claim 1, further comprising:
   a tail cover attached to the insulating layer with a self tapping screw,
   wherein the insulating portion includes screw holes.

3. An electric tool comprising:
   a metal outer casing;
   a motor comprising a stator and a rotor in the outer casing;
   a bearing rotatably supporting the rotor;
   a rotor supporting portion formed in the outer casing and directly supporting the bearing; and
   a continuously molded insulating layer on substantially all of an inner surface and on an outer surface of the metal outer casing, wherein the insulating layer covers the entire inner surface of the outer casing and the periphery of the rotor supporting portion.

4. The electric tool of claim 3, further comprising:
   a tail cover attached to the insulating layer with a self tapping screw,
   wherein the insulating portion comprises screw holes.

5. An electric tool comprising:

a metal outer casing;

a motor comprising a stator and a rotor in the outer casing;

a bearing rotatably supporting the rotor;

a rotor supporting portion formed in the outer casing supporting the bearing; and at least two insulating members comprising insulating resin material on substantially an entirety of an inner surface of the outer casing and on a periphery of the rotor supporting portion, wherein the insulating members comprise a continuously molded insulating piece on the inner surface of the outer casing and an insulating block on the rotor supporting portion and supporting ribs and wherein one of the insulating piece and the insulating block partially covers the other of the insulating piece and the insulating block.

6. The electric tool of claim 5, further comprising:

a tail cover attached to the insulating block with a self tapping screw, wherein the insulating block comprises screw holes.

7. An electric tool comprising:

an outer casing;

a motor comprising a stator and a rotor in the outer casing;

a bearing rotatably supporting the rotor of the motor in said outer casing;

a rotor support which directly supports said bearing; and an insulation layer continuously molded on substantially an entirety of an inner surface of the outer casing, wherein the insulation layer covers substantially the entirety of the inner surface of the outer casing and the rotor support.

8. The tool of claim 7, further comprising a tail cover attached to the insulation layer with a self tapping screw.

9. The tool of claim 8, wherein the insulation layer comprises a screw hole receiving the self tapping screw.

10. The tool of claim 7, wherein said insulation layer is also provided on an outer surface of said outer casing.

11. The tool of claim 7, further comprising an insulating block on said rotor support, and wherein one of the insulation layer and the insulating block partially covers the other one of the insulation layer and the insulating block.

12. The tool of claim 11, wherein said insulating block is also provided on supporting ribs of said outer casing.

13. The tool of claim 7, wherein said outer casing comprises metal.

* * * * *